US012613711B2

(12) United States Patent
Wang et al.

(10) Patent No.: US 12,613,711 B2
(45) Date of Patent: Apr. 28, 2026

(54) SHARED LIBRARY CONVERSION

(71) Applicant: International Business Machines Corporation, Armonk, NY (US)

(72) Inventors: Heng Wang, Beijing (CN); Tao Guan, Toronto (CA); Zhan Peng Huo, Beijing (CN); Sandhya Venugopala, Bangalore (IN); Xiao Ling Chen, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 497 days.

(21) Appl. No.: 18/341,834

(22) Filed: Jun. 27, 2023

(65) Prior Publication Data

US 2025/0004793 A1     Jan. 2, 2025

(51) Int. Cl.
*G06F 9/445*          (2018.01)

(52) U.S. Cl.
CPC ................................ *G06F 9/44521* (2013.01)

(58) Field of Classification Search
CPC .......................... G06F 9/44521; G06F 9/44526
See application file for complete search history.

(56) References Cited

U.S. PATENT DOCUMENTS 5,774,722 A    6/1998 Gheith
9,116,855 B2 *  8/2015 Araki ...................... G06F 15/16

9,569,246 B2    2/2017  Roehrig et al.
11,442,725 B1    9/2022  Chawda et al.
12,204,881 B2 *  1/2025  Zhang ................. G06F 9/45533
2005/0010911 A1    1/2005  Kim et al.
2018/0131764 A1    5/2018  Suter et al.
2021/0329100 A1 * 10/2021  Knight .................... H04L 67/51
2023/0092747 A1    3/2023  Wang et al.

FOREIGN PATENT DOCUMENTS

WO        2025/002732 A1     1/2025

OTHER PUBLICATIONS

De Toledo et al., "Improving Agility by Managing Shared Libraries in Microservices", International Conference on Agile Software Development, XP 2020, Agile Processes in Software Engineering and Extreme Programming—Workshops, Sep. 24, 2020, 8 pages. https://link.springer.com/chapter/10.1007/978-3-030-58858-8_20.
PCT International Search Report and Written Opinion, dated Aug. 13, 2024, regarding Application No. PCT/EP2024/065291, 14 pages.

* cited by examiner

*Primary Examiner* — Andy Ho
(74) *Attorney, Agent, or Firm* — Yee & Associates, P.C.

(57)                    ABSTRACT

Converting shared libraries is provided. A shadow shared library is generated based on symbol information of each respective symbol of an original shared library. A symbol receiver that corresponds to the shadow shared library is generated. The symbol receiver corresponding to the shadow shared library and the original shared library are deployed as a microservice on a set of servers.

19 Claims, 7 Drawing Sheets

COMPUTING ENVIRONMENT
100

FIG. 1

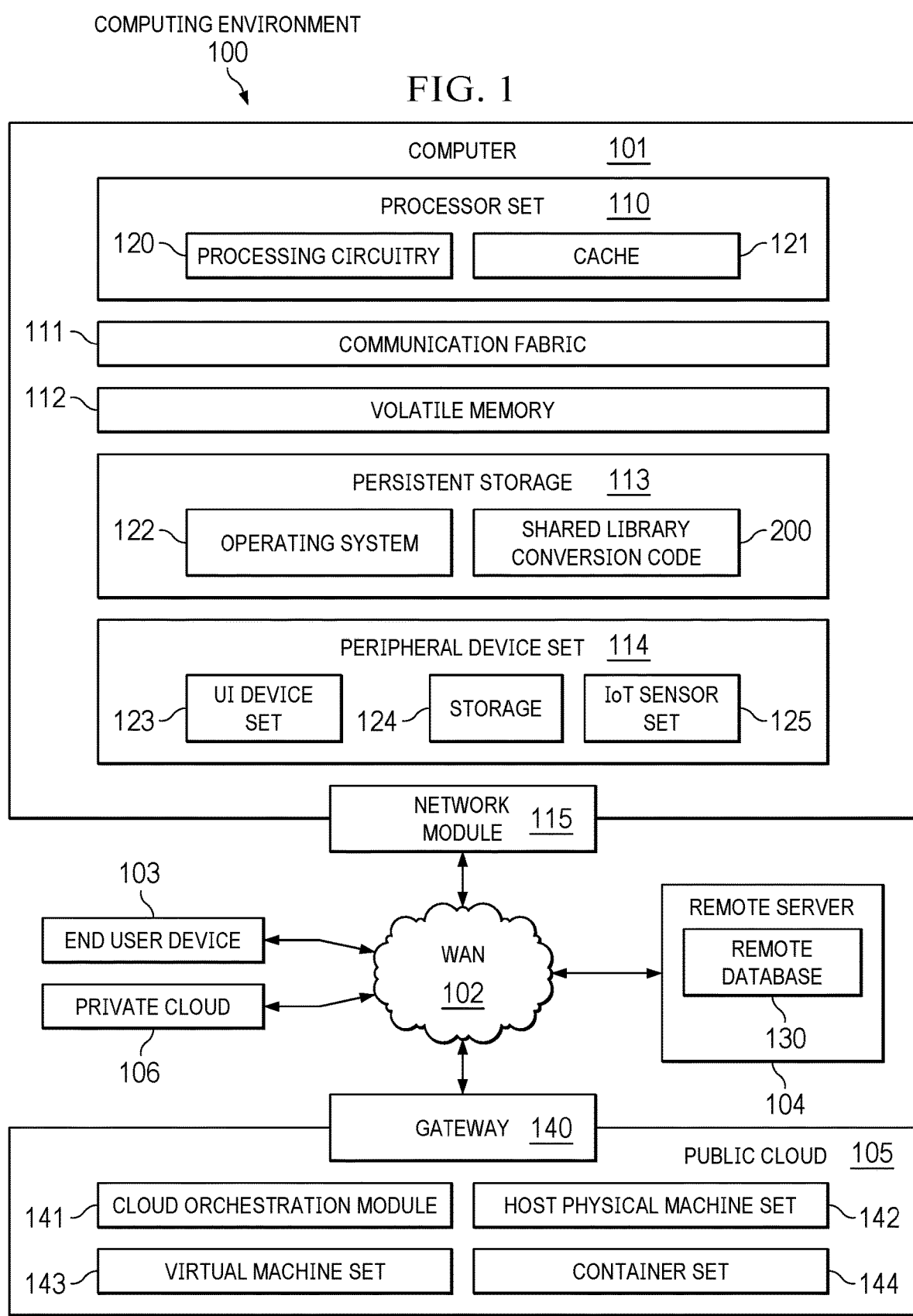

COMPUTER     101

PROCESSOR SET     110

120 ~ PROCESSING CIRCUITRY     CACHE ~ 121

111 ~ COMMUNICATION FABRIC

112 ~ VOLATILE MEMORY

PERSISTENT STORAGE     113

122 ~ OPERATING SYSTEM     SHARED LIBRARY CONVERSION CODE ~ 200

PERIPHERAL DEVICE SET     114

123 ~ UI DEVICE SET     124 ~ STORAGE     IoT SENSOR SET ~ 125

NETWORK MODULE     115

103

END USER DEVICE

PRIVATE CLOUD

106

WAN     102

REMOTE SERVER

REMOTE DATABASE

130

104

GATEWAY     140

PUBLIC CLOUD     105

141 ~ CLOUD ORCHESTRATION MODULE     HOST PHYSICAL MACHINE SET ~ 142

143 ~ VIRTUAL MACHINE SET     CONTAINER SET ~ 144

HYBRID CLOUD ENVIRONMENT

500

524 — APPLICATION

522 — SHADOW SHARED LIBRARY

CLIENT DEVICES

520 —

514                    514                    514

MICROSERVICE          MICROSERVICE          MICROSERVICE

SYMBOL RECEIVER       SYMBOL RECEIVER       SYMBOL RECEIVER 516   518              516   518              516   518

ORIGINAL SHARED LIBRARY   ORIGINAL SHARED LIBRARY   ORIGINAL SHARED LIBRARY

OS                    OS                    OS

SERVER 508            SERVER 510            SERVER 512

502 — PRIVATE CLOUD    504 — PUBLIC CLOUD    COMMUNITY CLOUD — 506

FIG. 6A ( START )

602 — RECEIVE, BY A COMPUTER, AN INPUT FROM A SYSTEM ADMINISTRATOR TO CONVERT AN ORIGINAL SHARED LIBRARY CORRESPONDING TO AN APPLICATION ASSOCIATED WITH A MICROSERVICE OF A HYBRID CLOUD ENVIRONMENT TO A SHADOW SHARED LIBRARY

604 — RETRIEVE, BY THE COMPUTER, USING AN OBJECT ANALYSIS COMPONENT, THE ORIGINAL SHARED LIBRARY FROM A SHARED LIBRARY DATABASE IN RESPONSE TO RECEIVING THE INPUT TO CONVERT THE ORIGINAL SHARED LIBRARY TO THE SHADOW SHARED LIBRARY

606 — SELECT, BY THE COMPUTER, USING THE OBJECT ANALYSIS COMPONENT, A BINARY UTILITY FROM A SET OF BINARY UTILITIES TO PARSE THE ORIGINAL SHARED LIBRARY

608 — PARSE, BY THE COMPUTER, USING THE BINARY UTILITY, THE ORIGINAL SHARED LIBRARY TO IDENTIFY SYMBOL INFORMATION CORRESPONDING TO EACH RESPECTIVE SYMBOL OF THE ORIGINAL SHARED LIBRARY, THE SYMBOL INFORMATION INCLUDES A SYMBOL NAME, A SYMBOL ENTRY ADDRESS, AND A SYMBOL BODY SIZE FOR EACH RESPECTIVE SYMBOL OF THE ORIGINAL SHARED LIBRARY

610 — EXTRACT, BY THE COMPUTER, USING THE OBJECT ANALYSIS COMPONENT, THE SYMBOL INFORMATION THAT INCLUDES THE SYMBOL NAME, THE SYMBOL ENTRY ADDRESS, AND THE SYMBOL BODY SIZE IDENTIFIED BY THE BINARY UTILITY FOR EACH RESPECTIVE SYMBOL OF THE ORIGINAL SHARED LIBRARY

612 — SEND, BY THE COMPUTER, USING THE OBJECT ANALYSIS COMPONENT, THE SYMBOL INFORMATION THAT INCLUDES THE SYMBOL NAME, THE SYMBOL ENTRY ADDRESS, AND THE SYMBOL BODY SIZE OF EACH RESPECTIVE SYMBOL OF THE ORIGINAL SHARED LIBRARY TO A SHADOW OBJECT GENERATION COMPONENT

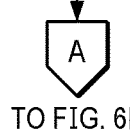

TO FIG. 6B

FROM FIG. 6A

614 —— GENERATE, BY THE COMPUTER, USING THE SHADOW OBJECT GENERATION COMPONENT, THE SHADOW SHARED LIBRARY BASED ON THE SYMBOL INFORMATION THAT INCLUDES THE SYMBOL NAME, THE SYMBOL ENTRY ADDRESS, AND THE SYMBOL BODY SIZE OF EACH RESPECTIVE SYMBOL OF THE ORIGINAL SHARED LIBRARY, THE SHADOW SHARED LIBRARY CONTAINS SAME SYMBOLS AS SYMBOLS CONTAINED IN THE ORIGINAL SHARED LIBRARY AND A SYMBOL BODY OF RESPECTIVE SYMBOLS CONTAINED IN THE SHADOW SHARED LIBRARY INCLUDES A REMOTE PROCEDURE CALL ABILITY AND A DETERMINED AMOUNT OF BODY PADDING IN A FORM OF A BUBBLE INSTRUCTION TO ENSURE THAT AN ENTRY ADDRESS OF A NEXT SYMBOL IN THE SHADOW SHARED LIBRARY IS EQUAL TO A SAME ENTRY ADDRESS OF A SAME NEXT SYMBOL IN THE ORIGINAL SHARED LIBRARY

616 —— GENERATE, BY THE COMPUTER, USING THE SHADOW OBJECT GENERATION COMPONENT, A SYMBOL RECEIVER THAT CORRESPONDS TO THE SHADOW SHARED LIBRARY, THE SYMBOL RECEIVER RECEIVES REMOTE PROCEDURE CALLS FROM THE SHADOW SHARED LIBRARY AND DETERMINES AN INTERCEPT SYMBOL ENTRY ADDRESS FOR RESPECTIVE SYMBOLS IN THE ORIGINAL SHARED LIBRARY BASED ON THE DETERMINED AMOUNT OF BODY PADDING IN THE SYMBOL BODY OF RESPECTIVE SYMBOLS CONTAINED IN THE SHADOW SHARED LIBRARY

618 —— DEPLOY, BY THE COMPUTER, THE SYMBOL RECEIVER THAT CORRESPONDS TO THE SHADOW SHARED LIBRARY AND THE ORIGINAL SHARED LIBRARY AS THE MICROSERVICE ON A SET OF SERVERS IN A SET OF CLOUDS OF THE HYBRID CLOUD ENVIRONMENT

620 —— INSTALL, BY THE COMPUTER, THE SHADOW SHARED LIBRARY AND THE APPLICATION ASSOCIATED WITH THE MICROSERVICE ON A SET OF CLIENT DEVICES, THE APPLICATION VIA THE SHADOW SHARED LIBRARY INVOKES THE MICROSERVICE THAT INCLUDES THE SYMBOL RECEIVER CORRESPONDING TO THE SHADOW SHARED LIBRARY AND THE ORIGINAL SHARED LIBRARY TO PERFORM A SET OF FUNCTIONS, THE SHADOW SHARED LIBRARY SENDS THE REMOTE PROCEDURE CALLS CORRESPONDING TO THE MICROSERVICE TO THE SYMBOL RECEIVER

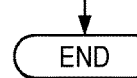

END

FIG. 6B

SHARED LIBRARY CONVERSION

BACKGROUND

The disclosure relates generally to libraries and more specifically to converting a shared library to a microservice.

A library is a collection of non-volatile resources used by software applications or programs. A library may include, for example, configuration data, documentation, help data, message templates, pre-written code and subroutines, classes, values, or type specifications. Library code is organized in such a way that it can be used by multiple applications that have no connection to each other. In contrast, application code is organized in such a way that it can be used only within that application. The distinguishing feature is that a library is organized for the purpose of being used by multiple independent applications, and the user only needs to know the interface and not the internal details of the library. When an application invokes a library, the application gains the behavior implemented inside that library without having to implement that behavior itself. In other words, libraries encourage the sharing of code.

SUMMARY

According to one illustrative embodiment, a computer-implemented method for converting shared libraries is provided. A computer generates a shadow shared library based on symbol information of each respective symbol of an original shared library. The computer generates a symbol receiver that corresponds to the shadow shared library. The computer deploys the symbol receiver corresponding to the shadow shared library and the original shared library as a microservice on a set of servers. According to other illustrative embodiments, a computer system and computer program product for converting shared libraries are provided.

BRIEF DESCRIPTION OF THE DRAWINGS

FIG. 1 is a pictorial representation of a computing environment in which illustrative embodiments may be implemented;

FIGS. 6A-6B are a flowchart illustrating a process for converting shared libraries into microservices in accordance with an illustrative embodiment.

DETAILED DESCRIPTION

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
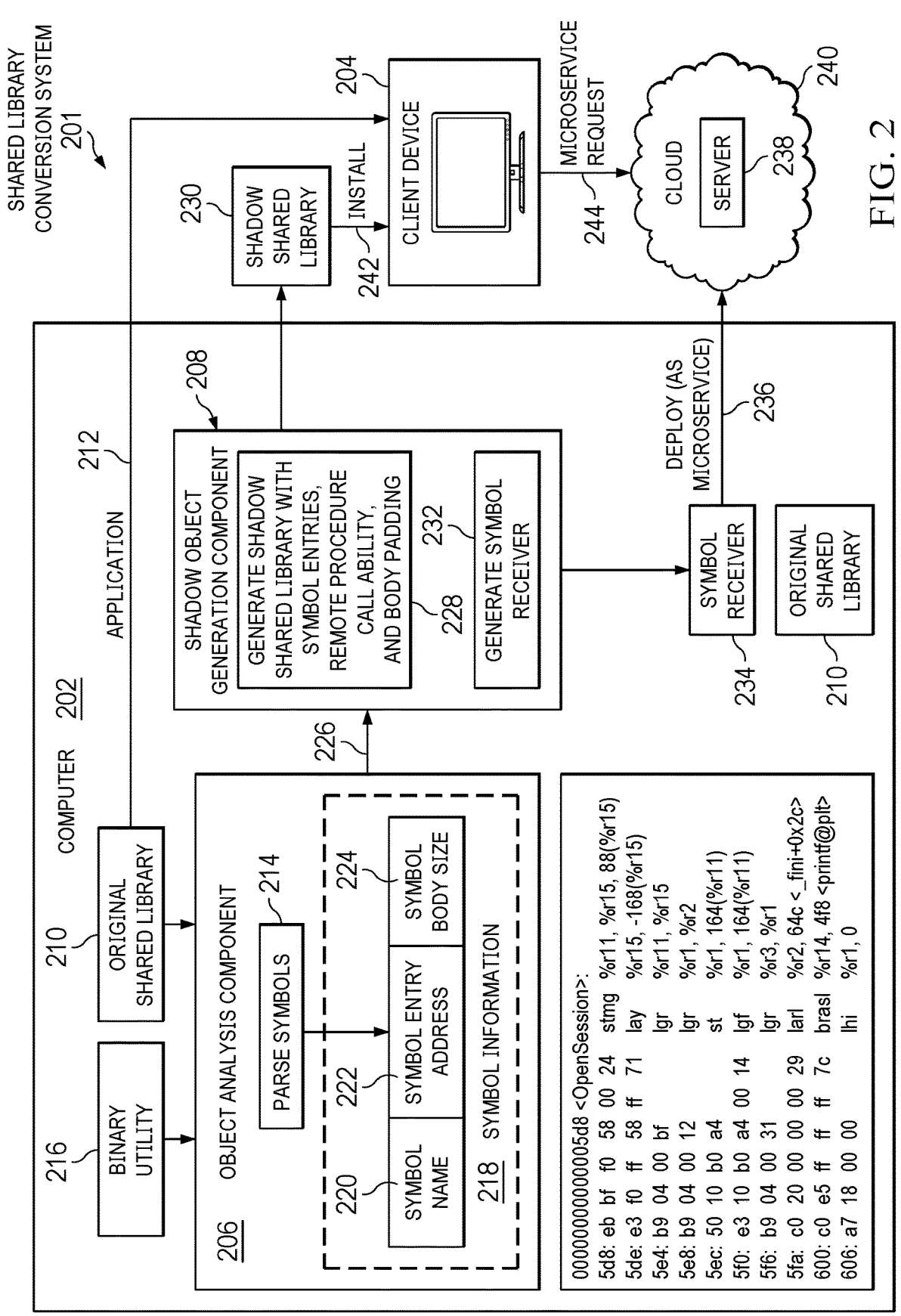
FIG. 2 is a diagram illustrating an example of a shared library conversion system in accordance with an illustrative embodiment.

With reference now to the figures, and in particular, with reference to FIGS. 1-2, diagrams of data processing environments are provided in which illustrative embodiments may be implemented. It should be appreciated that FIGS. 1-2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as shared library conversion code 200. For example, shared library conversion code 200 automatically converts an original shared library, which corresponds to an application that requests a microservice to be performed, to a shadow shared library by injecting additional remote procedure calls into the original shared library to form the shadow shared library, which redirects operations to the original shared library upon receipt of a request for the microservice from the application. Shared library conversion code 200 utilizes an object analysis component to analyze the original shared library and retrieve all the symbols and their corresponding entry addresses from the original shared library. Shared library conversion code 200 utilizes a shadow object generation component to generate the shadow shared library and a symbol receiver with remote procedure call ability. The shadow object generation component utilizes the output of the object analysis component to generate the shadow shared library and symbol receiver. Thus, any applications that can communicate with the original shared library can communicate with the shadow shared library without any compiling or linking of the shadow shared library. As a result, any microservice requests from the application installed on a client device can route to the symbol receiver deployed on a server and then the symbol receiver can route the request to the original shared library, which is also deployed on the server.

In addition to shared library conversion code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and shared library conversion code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, mainframe computer, quantum computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in shared library conversion code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source Portable Operating System Interface-type operating systems that employ a kernel. The shared library conversion code included in block 200 includes at least some of the computer code involved in performing the inventive methods of illustrative embodiments.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator corresponding to the shared library conversion services provided by computer 101), and may take any of the forms discussed above in connection with computer 101. EUD 103 typically receives helpful and useful data from the operations of computer 101. For example, in a hypothetical case where computer 101 is designed to provide a shared library conversion recommendation to the end user, this recommendation would typically be communicated from network module 115 of computer 101 through WAN 102 to EUD 103. In this way, EUD 103 can display, or otherwise present, the shared library conversion recommendation to the end user. In some embodiments, EUD 103 may be a client device, such as thin client, heavy client, mainframe computer, desktop computer, laptop computer, tablet computer, smart television, smart watch, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a shared library conversion recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economics of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A; one of item B; and ten of item C; four of item B and seven of item C; or other suitable combinations.

A shared library is a file that is intended to be utilized by multiple applications. One issue with current shared libraries is that these current shared libraries cannot be invoked by multiple cloud services in a cloud environment. An ability to convert a shared library into a microservice enabling the microservice to use that shared library in a cloud-based environment would reduce the cost of cloud service enablement and increase performance. Another issue is a shared library (e.g., a firmware shared library) that can be used to operate a hardware device, such as, for example, a hardware security module. To package the hardware device to a cloud service, code has to be developed to wrap the shared library to the cloud service. An ability to provide a shared library that can operate a hardware device as a microservice in a cloud-based environment without wrapping the shared library in code would reduce the cost of cloud service enablement and increase performance.

Microservices are a variant of the service-oriented architecture structural style. A microservice architecture arranges an application as a collection of loosely-coupled, fine-grained microservices that communicate using lightweight protocols. In other words, in a microservice architecture, an application is built as independent components that run each application function or process as a separate microservice. As a result, microservices can be deployed independently of each other. Microservices are deployed, for example, in containers of a container orchestration platform, architecture, environment, or the like. A container orchestration platform, architecture, or environment, such as, for example, Kubernetes® (a registered trademark of the Linux Foundation of San Francisco, CA, USA), provides a platform for automating deployment, scaling, and operations of containers across clusters of host nodes. Containers are lightweight executables that package microservices together with the application code, libraries, and their dependencies needed to run the microservices.

Illustrative embodiments convert a local call to an original shared library to a remote call to the original shared library automatically by injecting additional remote procedure calls into the original shared library while compiling the original shared library to generate a shadow shared library that redirects operations to the original shared library so that the original shared library can be invoked across different environments, architectures, platforms, operating systems, containers, clusters of host nodes, or the like. The shadow shared library consists of symbols, which are the same symbols that are contained in the original shared library, and remote procedure calls. The remote procedure calls manage, for example, data types, stack frame organization, function parameter passing, remote networking communication, and the like. In distributed computing, a remote procedure call is when an application causes a procedure or subroutine to execute in a different address space (typically on another computer on a shared network), which is written as if it were a local procedure call, without the programmer explicitly writing the details for the remote interaction. In other words, a remote procedure call enables a function to be triggered in an application (e.g., microservice) running on a different computer.

Illustrative embodiments utilize an object analysis component and a shadow object generation component to automatically convert the original shared library corresponding to the microservice to the shadow shared library. Illustrative embodiments utilize the object analysis component to analyze the original shared library and identify all of the symbols and their corresponding symbol entry addresses contained in the original shared library. Illustrative embodiments then utilize the shadow object generation component to generate the shadow shared library with remote procedure call ability and instruction bubble body padding based on the output (i.e., all the symbols and their entry addresses contained in the local shared library) of the object analysis component. An instruction bubble is code that does not perform a function and acts as a place holder in the body of a given symbol. It should be noted that each symbol in the shadow shared library has the same symbol name, entry address, and body size as its corresponding symbol in the original shared library so that an application can link to the shadow shared library without any recompilation or relinking. Illustrative embodiments also utilize the shadow object generation component to generate a symbol receiver that corresponds to the shadow shared library. Illustrative embodiments deploy the original shared library and the symbol receiver on a set of servers in a cloud environment.

As a result, any application that can link to the original shared library can link to the shadow shared library without any recompiling or relinking of the shadow shard library. Illustrative embodiments install the shadow shared library and the application on client devices. A request for the microservice running on the server from an application installed on a client device can route to the symbol receiver deployed on the server using the remote procedure calls of the shadow shared library. In turn, the symbol receiver routes the request for the microservice to the original shared library using symbol intercept entry addresses, which are based on a determined amount of bubble instruction body padding provided by the shadow shared library. In other words, the symbol receiver receives the request from the shadow shared library installed on the client device and performs the invocation to the original shared library deployed on the server.

Moreover, hardware cryptographic services that provide control of encryption keys and data protection in hardware security modules can utilize shadow shared libraries generated by illustrative embodiments for loading and coordinating access to the hardware security modules at runtime in a cloud environment. Thus, illustrative embodiments are capable of invoking original shared libraries across microservices and hardware architectures using the shadow shared libraries of illustrative embodiments.

Thus, illustrative embodiments provide one or more technical solutions that overcome a technical problem with an inability of current solutions to provide a shared library as a microservice in a cloud environment. As a result, these one or more technical solutions provide a technical effect and practical application in the field of shared libraries.

With reference now to FIG. 2, a diagram illustrating an example of a shared library conversion system is depicted in accordance with an illustrative embodiment. Shared library conversion system 201 may be implemented in a computing environment, such as computing environment 100 in FIG. 1. Shared library conversion system 201 is a system of hardware and software components for converting shared libraries to microservices.

In this example, shared library conversion system 201 includes computer 202, client device 204, and server 238. Computer 202 may be, for example, computer 101 in FIG. 1. Client device 204 may be, for example, EUD 103 in FIG. 1. Server 238 may be, for example, one of host physical machine set 142 or virtual machine set 143 in FIG. 1. However, it should be noted that shared library conversion system 201 is intended as an example only and not as a limitation on illustrative embodiments. For example, shared library conversion system 201 can include any number of computers, client devices, servers, and other devices and components not shown.

In this example, computer 202 includes object analysis component 206 and shadow object generation component 208. Object analysis component 206 and shadow object generation component 208 can be implemented by shared library conversion code 200 in FIG. 1.

Computer 202 utilizes object analysis component 206 to analyze original shared library 210. Original shared library 210 can represent any type of shared library, including a firmware shared library. Original shared library 210 corresponds to application 212.

At 214, object analysis component 206 utilizes binary utility 216 to parse original shared library 210 to identify symbol information 218 corresponding to all of the symbols contained in original shared library 210. Symbol information 218 includes symbol name 220, symbol entry address 222, and symbol body size 224 for each respective symbol identified in original shared library 210 by binary utility 216.

At 226, object analysis component 206 sends symbol information 218, which includes symbol name 220, symbol entry address 222, and symbol body size 224 for each respective symbol in original shared library 210, to shadow object generation component 208. At 228, shadow object generation component 208 generates shadow shared library 230. Shadow shared library 230 contains symbol entries that are the same as all of the symbols contained in original shared library 210, remote procedure call abilities, and body paddings. An example of body padding may be a bubble instruction located in a body of a symbol.

At 232, shadow object generation component 208 also generates symbol receiver 234. Symbol receiver 234 corresponds to shadow shared library 230, which means that shadow shared library 230 can communicate with symbol receiver 234 via remote procedure calls.

At 236, computer 202 deploys symbol receiver 234 and original shared library 210 as a microservice on server 238 located in cloud 240. It should be noted that server 238 can represent a set of servers. Cloud 240 can be, for example, public cloud 105 or private cloud 106 in FIG. 1.

In addition, at 242, computer 202 installs shadow shared library 230 and application 212, which corresponds to original shared library 210, on client device 204. It should be noted that client device 204 can represent a plurality of client devices.

At 244, a user of client device 204, utilizes application 212 to send a request for the microservice deployed on server 238. Application 212 utilizes shadow shared library 230 to send remote procedure calls corresponding to the microservice to server 238. Server 238 utilizes symbol receiver 234 to receive the remote procedure calls and determine intercept entry addresses of symbols in original shared library 210 to perform the functions of the microservice.

Figure 3:
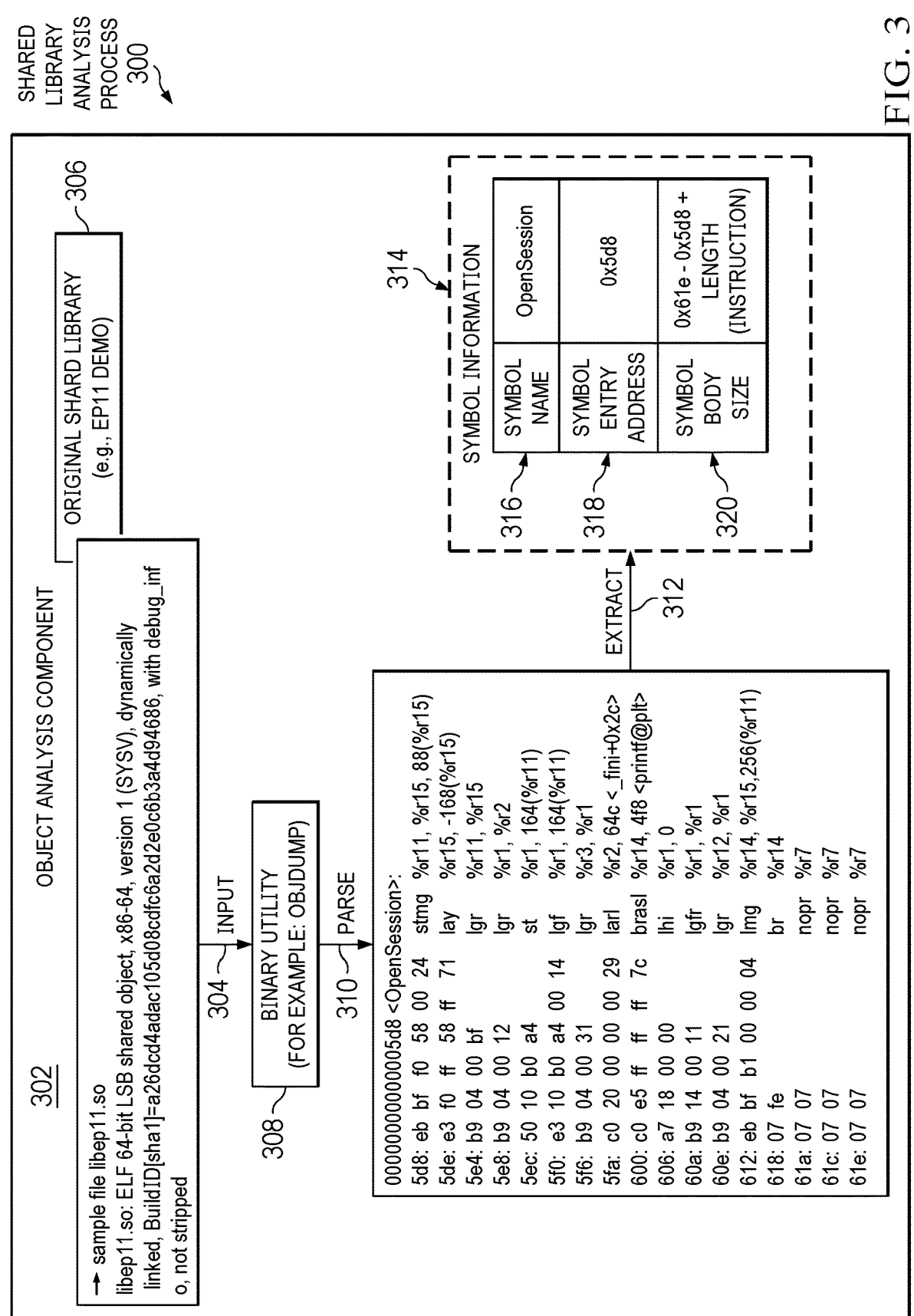
FIG. 3 is a diagram illustrating an example of a shared library analysis process in accordance with an illustrative embodiment.

With reference now to FIG. 3, a diagram illustrating an example of a shared library analysis process is depicted in accordance with an illustrative embodiment. Shared library analysis process 300 is implemented in object analysis component 302, such as, for example, object analysis component 206 in FIG. 2.

At 304, object analysis component 302 inputs original shared library 306 into binary utility 308. Original shared library 306 may be, for example, a firmware shared library, such as EP11, which can coordinate access to a hardware security module. Binary utility 308 may be, for example, an object dump utility. Binary utility 308 can represent a set of binary utilities that include a set of programming tools for creating and managing binary libraries, programs, object files, profile data, assembly source code, or the like.

At 310, object analysis component 302 utilizes binary utility 308 to parse original shared library 306. At 312, in response to binary utility 308 parsing original shared library 306, object analysis component 302 analyzes the output of binary utility 308 and extracts symbol information 314, such as, for example, symbol information 218 in FIG. 2. Symbol information 314 includes symbol name 316, symbol entry address 318 (e.g., an offset), and symbol body size 320 of each respective symbol contained in original shared library 306. Object analysis component 302 calculates the body size of each respective symbol as being equal to an end address of that particular symbol minus an entry address of that particular symbol plus the length of one machine instruction. Each symbol in original shared library 306 is associated with information relating to its declaration or appearance in the code of original shared library 306.

Figure 4:
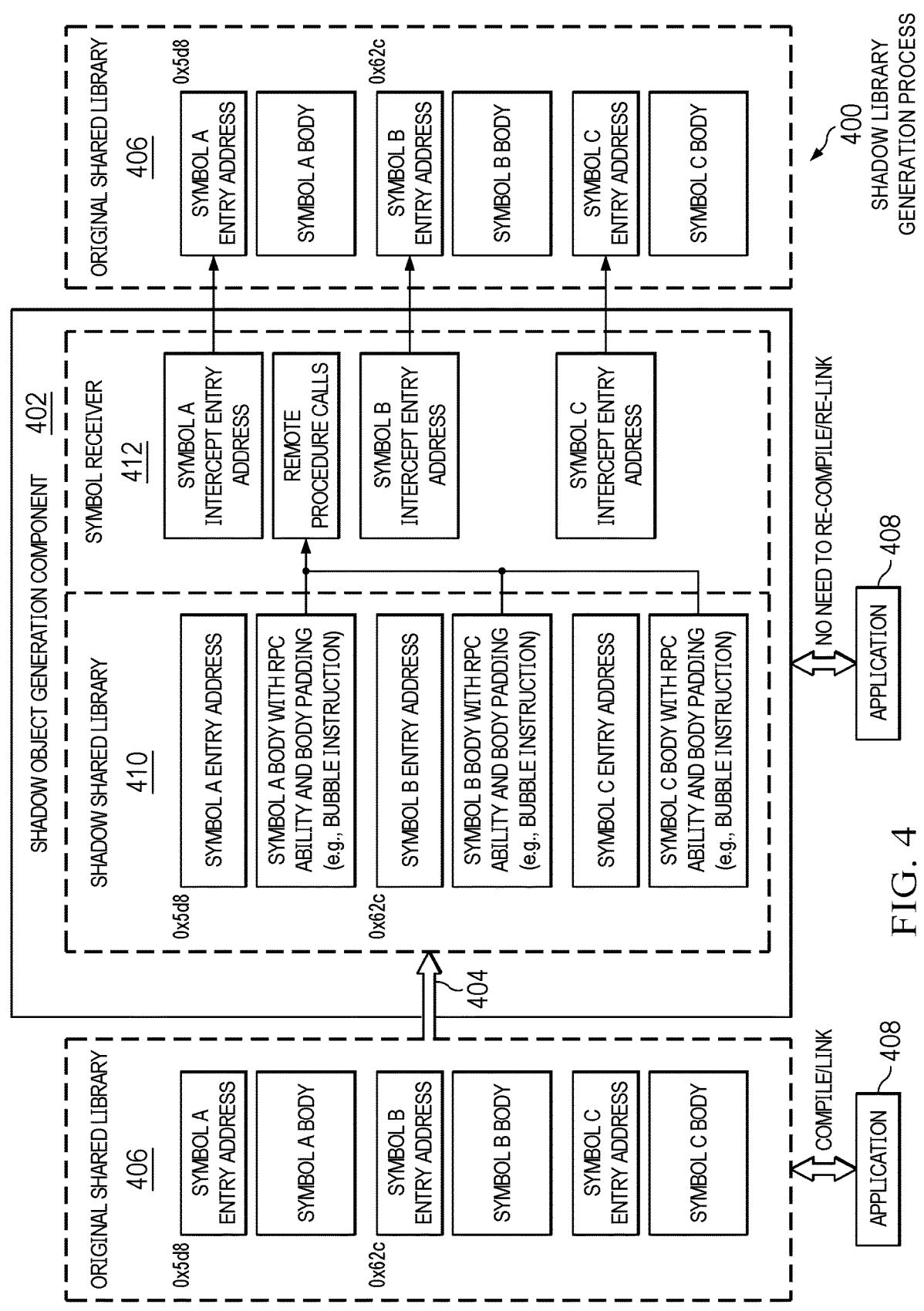
FIG. 4 is a diagram illustrating an example of a shadow library generation process in accordance with an illustrative embodiment.

With reference now to FIG. 4, a diagram illustrating an example of a shadow library generation process is depicted in accordance with an illustrative embodiment. Shadow library generation process 400 is implemented in shadow object generation component 402, such as, for example, shadow object generation component 208 in FIG. 2.

At 404, in response to receiving symbol information regarding original shared library 406, which corresponds to application 408, from an object analysis component, such as, for example, object analysis component 302 in FIG. 3, shadow object generation component 402 generates shadow shared library 410. Shadow shared library 410 can be, for example, shadow shared library 230 in FIG. 2. Original shared library 406 can be, for example, original shared library 306 in FIG. 3. The symbol information regarding original shared library 406 can be, for example, symbol information 314 in FIG. 3. The symbol information includes the name, entry address, and body size, such as, for example, symbol name 316, symbol entry address 318, and symbol body size 320 in FIG. 3, of each respective symbol contained in original shared library 406. As a result, shadow shared library 410 contains all the same symbol information as original shared library 406.

For example, for each respective symbol (e.g., symbol A), shadow object generation component 402 keeps the symbol name and symbol entry address in shadow shared library 410 equal to, or the same as, the symbol name and symbol entry address of symbol A in original shared library 406. However, the body of symbol A in shadow shared library 410 now contains remote procedure call ability that can serialize parameters of remote procedure calls for a microservice request. Moreover, shadow object generation component 402 adds a determined amount of bubble instruction padding to the bottom of the body of symbol A to ensure that the entry address of the next symbol (e.g., symbol B) in shadow shared library 410 is equal to, or the same as, the entry address of symbol B in original shared library 406.

Furthermore, shadow object generation component 402 generates symbol receiver 412, which corresponds to shadow shared library 410. Symbol receiver 412 can be, for example, symbol receiver 234 in FIG. 2. Shadow shared library 410 sends the remote procedure calls for the microservice to symbol receiver 412.

Figure 5:
FIG. 5 is a diagram illustrating an example of a hybrid cloud environment in accordance with an illustrative embodiment.

With reference now to FIG. 5, a diagram illustrating an example of a hybrid cloud environment is depicted in accordance with an illustrative embodiment. Hybrid cloud environment 500 can be implemented in, for example, computing environment 100 in FIG. 1.

In this example, hybrid cloud environment 500 includes private cloud 502, public cloud 504, and community cloud 506. However, it should be noted that hybrid cloud environment 500 is intended as an example only and not as a limitation on illustrative embodiments. For example, hybrid cloud environment 500 can include any number and types of clouds.

In this example, private cloud 502 includes server 508, public cloud 504 includes server 510, and community cloud 506 includes server 512. Server 508, server 510, and server 512 may each represent a set of servers in their respective cloud environments. In addition, each of server 508, server 510, and server 512 includes microservice 514, which is comprised of symbol receiver 516 and original shared library 518. In this example, microservice 514 represents the same microservice. However, it should be noted that in an alternative illustrative embodiment microservice 514 can represent a plurality of different microservices.

Client devices 520 are clients of server 508, server 510, and server 512. Each of client devices 520 includes shadow shared library 522 and application 524, such as, for example, shadow shared library 410 and application 408 in FIG. 4. Shadow shared library 522 corresponds to symbol receiver 516, such as, for example, symbol receiver 412 in FIG. 4. Application 524 corresponds to original shared library 518.

With reference now to FIGS. 6A-6B, a flowchart illustrating a process for converting shared libraries is shown in accordance with an illustrative embodiment. The process shown in FIGS. 6A-6B may be implemented in a computer, such as, for example, computer 101 in FIG. 1 or computer 202 in FIG. 2. For example, the process shown in FIGS. 6A-6B may be implemented in shared library conversion code 200 in FIG. 1.

The process begins when the computer receives an input from a system administrator to convert an original shared library corresponding to an application associated with a microservice of a hybrid cloud environment to a shadow shared library (step 602). The computer, using an object analysis component, retrieves the original shared library from a shared library database in response to receiving the input to convert the original shared library to the shadow shared library (step 604).

In addition, the computer, using the object analysis component, selects a binary utility from a set of binary utilities to parse the original shared library (step 606). The computer, using the binary utility, parses the original shared library to identify symbol information corresponding to each respective symbol of the original shared library (step 608). The symbol information includes a symbol name, a symbol entry address, and a symbol body size for each respective symbol of the original shared library. The computer, using the object analysis component, extracts the symbol information that includes the symbol name, the symbol entry address, and the symbol body size identified by the binary utility for each respective symbol of the original shared library (step 610).

The computer, using the object analysis component, sends the symbol information that includes the symbol name, the symbol entry address, and the symbol body size of each respective symbol of the original shared library to a shadow object generation component (step 612). The computer, using the shadow object generation component, generates the shadow shared library based on the symbol information that includes the symbol name, the symbol entry address, and the symbol body size of each respective symbol of the original shared library (step 614). The shadow shared library contains same symbols as symbols contained in the original shared library and a symbol body of respective symbols contained in the shadow shared library includes a remote procedure call ability and a determined amount of body padding in a form of a bubble instruction to ensure that an entry address of a next symbol in the shadow shared library is equal to a same entry address of a same next symbol in the original shared library. Further, the computer, using the shadow object generation component, generates a symbol receiver that corresponds to the shadow shared library (step 616). The symbol receiver receives remote procedure calls from the shadow shared library and determines an intercept symbol entry address for respective symbols in the original shared library based on the determined amount of body padding in the symbol body of respective symbols contained in the shadow shared library.

The computer deploys the symbol receiver that corresponds to the shadow shared library and the original shared library as the microservice on a set of servers in a set of clouds of the hybrid cloud environment (step 618). Furthermore, the computer installs the shadow shared library and the application associated with the microservice that includes the symbol receiver that corresponds to the shadow shared library and the original shared library on a set of client devices (step 620). The application via the shadow shared library invokes the microservice that includes the symbol receiver that corresponds to the shadow shared library and the original shared library to perform a set of functions. It should be noted that the application links to the shadow shared library without any recompiling or relinking of the shadow shard library. The shadow shared library sends the remote procedure calls corresponding to the microservice to the symbol receiver.

Thus, illustrative embodiments of the present disclosure provide a computer-implemented method, computer system, and computer program product for converting a shared library to a microservice of a cloud environment. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method for converting shared libraries, the computer-implemented method comprising:

parsing, by a computer, using a binary utility, an original shared library to identify symbol information corresponding to each respective symbol of the original shared library, the symbol information includes a symbol name, a symbol entry address, and a symbol body size for each respective symbol of the original shared library;

extracting, by the computer, the symbol information that includes the symbol name, the symbol entry address, and the symbol body size for each respective symbol of the original shared library;

generating, by the computer, a shadow shared library based on the symbol information of each respective symbol of the original shared library;

generating, by the computer, a symbol receiver that corresponds to the shadow shared library; and deploying, by the computer, the symbol receiver corresponding to the shadow shared library and the original shared library as a microservice on a set of servers.

2. The computer-implemented method of claim 1, further comprising:

installing, by the computer, the shadow shared library and an application associated with the microservice that includes the symbol receiver corresponding to the shadow shared library and the original shared library on a set of client devices.

3. The computer-implemented method of claim 2, wherein the application via the shadow shared library invokes the microservice that includes the symbol receiver corresponding to the shadow shared library and the original shared library to perform a set of functions, the shadow shared library sends remote procedure calls corresponding to the microservice to the symbol receiver.

4. The computer-implemented method of claim 3, wherein the application links to the shadow shared library without recompiling or relinking of the shadow shared library.

5. The computer-implemented method of claim 3, wherein the shadow shared library contains same symbols as symbols contained in the original shared library and a symbol body of respective symbols contained in the shadow shared library includes a remote procedure call ability and a determined amount of body padding to ensure that an entry address of a next symbol in the shadow shared library is equal to a same entry address of a same next symbol in the original shared library.

6. The computer-implemented method of claim 5, wherein the symbol receiver receives the remote procedure calls from the shadow shared library and determines an intercept symbol entry address for respective symbols in the original shared library based on the determined amount of body padding in the symbol body of respective symbols contained in the shadow shared library.

7. The computer-implemented method of claim 5, wherein the determined amount of body padding is in a form of a bubble instruction.

8. The computer-implemented method of claim 1, further comprising:

receiving, by the computer, an input to convert the original shared library to the shadow shared library;

retrieving, by the computer, the original shared library from a shared library database in response to receiving the input to convert the original shared library to the shadow shared library; and selecting, by the computer, the binary utility to parse the original shared library.

9. The computer-implemented method of claim 1, wherein the set of servers where the symbol receiver corresponding to the shadow shared library and the original shared library are deployed as the microservice is located in a set of clouds of a hybrid cloud environment.

10. A computer system for converting shared libraries, the computer system comprising:

a communication fabric;

a storage device connected to the communication fabric, wherein the storage device stores program instructions; and a processor connected to the communication fabric, wherein the processor executes the program instructions to:

parse, using a binary utility, an original shared library to identify symbol information corresponding to each respective symbol of the original shared library, the symbol information includes a symbol name, a symbol entry address, and a symbol body size for each respective symbol of the original shared library;

extract the symbol information that includes the symbol name, the symbol entry address, and the symbol body size for each respective symbol of the original shared library;

generate a shadow shared library based on the symbol information of each respective symbol of the original shared library;

generate a symbol receiver that corresponds to the shadow shared library; and deploy the symbol receiver corresponding to the shadow shared library and the original shared library as a microservice on a set of servers.

11. The computer system of claim 10, wherein the processor further executes the program instructions to:

install the shadow shared library and an application associated with the microservice that includes the symbol receiver corresponding to the shadow shared library and the original shared library on a set of client devices.

12. The computer system of claim 11, wherein the application via the shadow shared library invokes the microservice that includes the symbol receiver corresponding to the shadow shared library and the original shared library to perform a set of functions, the shadow shared library sends remote procedure calls corresponding to the microservice to the symbol receiver.

13. The computer system of claim 12, wherein the application links to the shadow shared library without recompiling or relinking of the shadow shared library.

14. A computer program product for converting shared libraries, the computer program product comprising a computer-readable storage medium having program instructions embodied therewith, the program instructions executable by a computer to cause the computer to:

parse, using a binary utility, an original shared library to identify symbol information corresponding to each respective symbol of the original shared library, the symbol information includes a symbol name, a symbol entry address, and a symbol body size for each respective symbol of the original shared library;

extract the symbol information that includes the symbol name, the symbol entry address, and the symbol body size for each respective symbol of the original shared library;

generate a shadow shared library based on the symbol information of each respective symbol of the original shared library;

generate a symbol receiver that corresponds to the shadow shared library; and deploy the symbol receiver corresponding to the shadow shared library and the original shared library as a microservice on a set of servers.

15. The computer program product of claim 14, wherein the program instructions further cause the computer to:

install the shadow shared library and an application associated with the microservice that includes the symbol receiver corresponding to the shadow shared library and the original shared library on a set of client devices.

16. The computer program product of claim 15, wherein the application via the shadow shared library invokes the microservice that includes the symbol receiver corresponding to the shadow shared library and the original shared library to perform a set of functions, the shadow shared library sends remote procedure calls corresponding to the microservice to the symbol receiver.

17. The computer program product of claim 16, wherein the application links to the shadow shared library without recompiling or relinking of the shadow shared library.

18. The computer program product of claim 16, wherein the shadow shared library contains same symbols as symbols contained in the original shared library and a symbol body of respective symbols contained in the shadow shared library includes a remote procedure call ability and a determined amount of body padding to ensure that an entry address of a next symbol in the shadow shared library is equal to a same entry address of a same next symbol in the original shared library.

19. The computer program product of claim 18, wherein the symbol receiver receives the remote procedure calls from the shadow shared library and determines an intercept symbol entry address for respective symbols in the original shared library based on the determined amount of body padding in the symbol body of respective symbols contained in the shadow shared library.

* * * * *